United States Patent [19]
Reese et al.

[11] Patent Number: 5,837,937
[45] Date of Patent: Nov. 17, 1998

[54] ELECTRICAL COVER PLATE

[75] Inventors: Michael J. Reese; G. Bruce Meisner; John C. Conger, all of Phoenix, Ariz.

[73] Assignee: Ultimate Presentation Systems, Inc., Tempe, Ariz.

[21] Appl. No.: 823,103

[22] Filed: Mar. 24, 1997

[51] Int. Cl.⁶ ................................................. H05K 5/03
[52] U.S. Cl. ............................ 174/66; 220/242; 439/148
[58] Field of Search ................................ 174/55, 66, 67, 174/53, 17 CT, 56; 220/241, 242, 3.8; 439/148

[56] References Cited

U.S. PATENT DOCUMENTS

| 2,106,588 | 1/1938 | Benander . | |
|---|---|---|---|
| 2,437,802 | 3/1948 | Adler . | |
| 2,630,477 | 3/1953 | Rypinski | 174/66 |
| 3,437,737 | 4/1969 | Wagner | 174/55 |
| 3,437,738 | 4/1969 | Wagner . | |
| 3,953,933 | 5/1976 | Goldstein | 40/642.02 |
| 4,293,173 | 10/1981 | Tricca | 174/67 |
| 4,479,317 | 10/1984 | Hanna . | |
| 4,780,573 | 10/1988 | Own | 174/66 |
| 4,800,239 | 1/1989 | Hill . | |
| 5,041,698 | 8/1991 | Takagi et al. | 174/66 |
| 5,073,681 | 12/1991 | Hubben et al. | 174/66 |
| 5,114,365 | 5/1992 | Thompson et al. . | |
| 5,153,816 | 10/1992 | Griffin . | |
| 5,449,860 | 9/1995 | Buckshaw et al. | 174/67 |
| 5,594,206 | 1/1997 | Klas et al. | 174/67 |

FOREIGN PATENT DOCUMENTS 968882  6/1975  Canada ...................................... 174/66

Primary Examiner—Renee S. Luebke
Assistant Examiner—Dhiru R Patel
Attorney, Agent, or Firm—Ryndak & Lyerla

[57] ABSTRACT

A cover plate (100, 200) for accommodating a wide variety of different electrical outlets, switches and connectors is formed from a first layer of transparent material (120) that is laminated to a second layer of colored material (122) that is laminated to a third layer of metal (124). Prior to lamination of the third layer to the second layer, selected portions of the second layer are removed by machining or engraving. The engraved portion may be filled with paints that contrast in color to the color of the colored foil, providing selected areas with decorative and or informative information. The engraved portion is protected from wear and tear by encapsulation between the second layer (122) and the third layer (124).

12 Claims, 2 Drawing Sheets

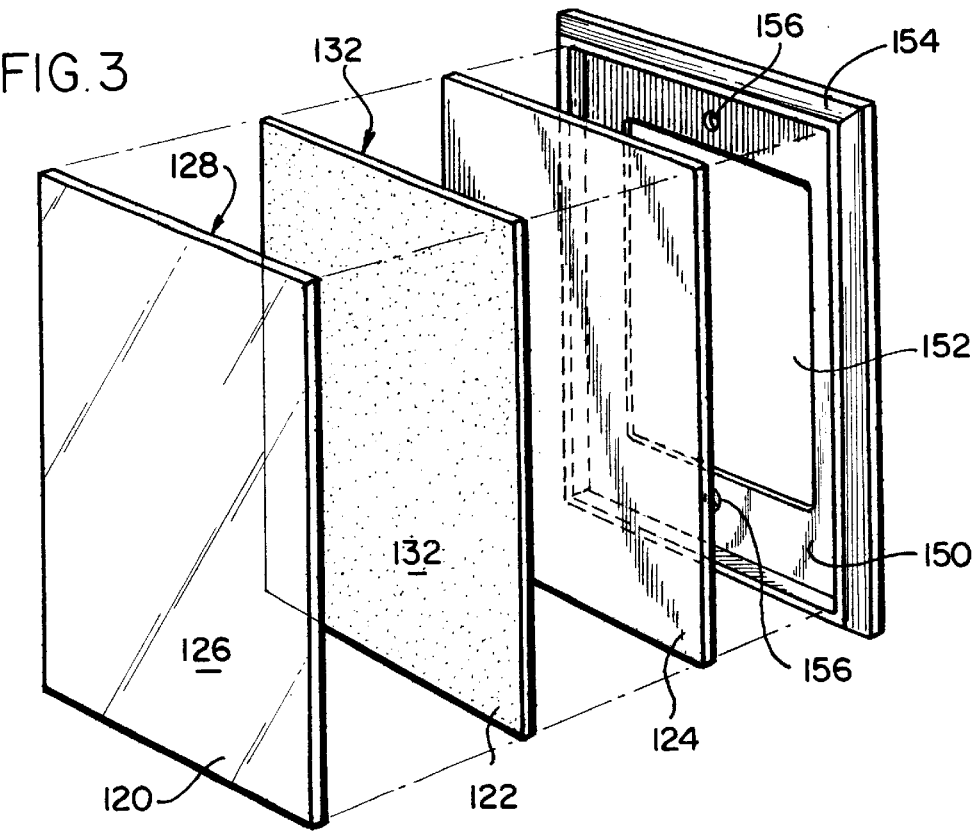
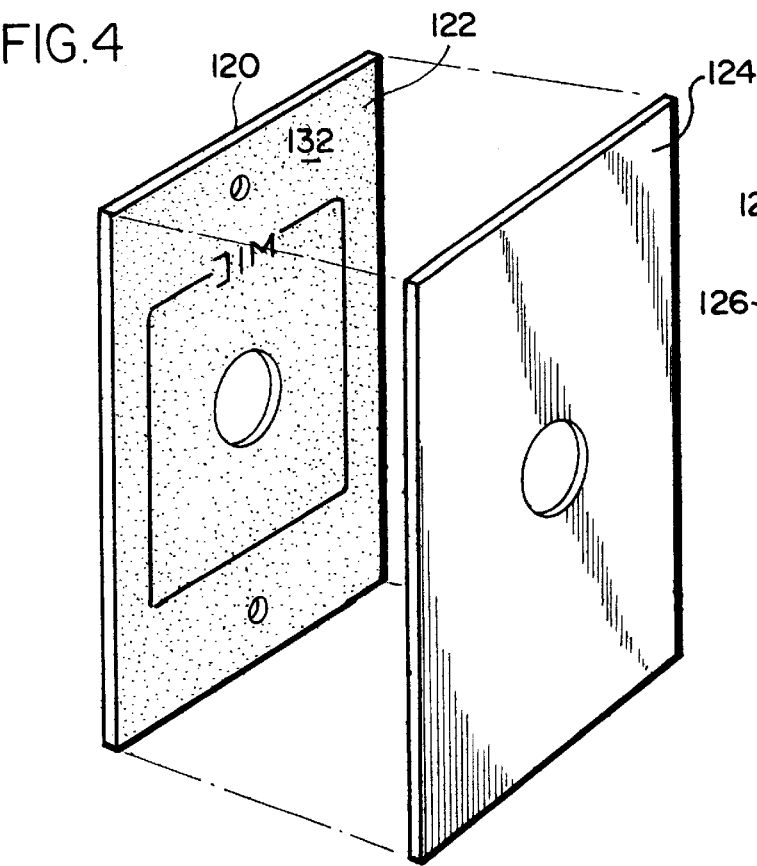
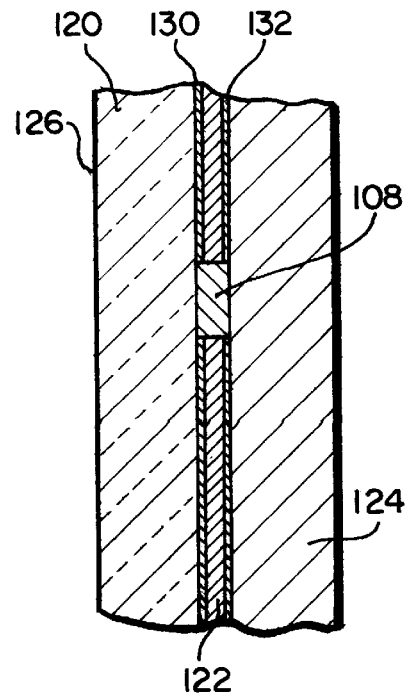

_5,837,937_

ELECTRICAL COVER PLATE

FIELD OF THE INVENTION

The invention relates to cover plates for electrical outlets and switches, and in particular, to informative and decorative cover plates for accommodating a wide variety of different electrical outlets, switches and connectors.

BACKGROUND OF THE INVENTION

Cover plates and assemblies for electrical outlets and switches are known. These cover plates provide protection from the associated electronics and safe access to make connections or otherwise control electrical equipment. As the use of electrical equipment has increased immensely, a variety of switches and electrical connections have become necessary. In particular, increased use of switches and connectors in the audio and visual electronics field has multiplied the number of switches and connectors and their uses.

In addition to an increase in the number and types of connectors, the complexity associated with the use of the connectors has also increased. Therefore, it is necessary to include informative information on cover plates for use with complex electrical connections. Indeed, the information associated with a particular electrical connection often is unique and must be customized for the particular connection.

Therefore, a need exists for a cover plate for electrical outlets, connectors and switches that is informative, decorative, customizable and can accommodate a variety of electrical connections.

SUMMARY OF THE INVENTION

In accordance with the present invention, a cover plate is formed from a first layer of transparent plastic material having a top surface and a bottom surface. A second layer of colored material is laminated to the bottom surface of the first layer of transparent material to give the laminated layers the appearance of being colored. Portions of the layer of colored material are selectively removed to expose the transparent plastic material, revealing decorative or informative patterns. Preferably, the removed portion is filled with paint that is of a color contrasting to the color of the colored-material layer. For example, the colored-material layer may be of grey color and have portions removed to reveal pertinent information related to the electronics associated with the cover, such as words, for example, "video" to indicate a video connection. The "video" portion may be filled with red paint to contrast with the grey background.

To reinforce the strength of the plate and protect the engraved and paint-filled portion, a layer of metal is laminated to the layer of colored material. After lamination of the layers, the plate may be bored to receive hardware for mounting the plate and any electrical connectors needed for the plate.

The cover plate may be used to cover a standard wall outlet box. Alternatively, a decorative bezel may be added for receiving and encircling the cover plate. The cover plate may also be used as a cover for a rack of electrical equipment, such as a rack of audio and video equipment.

BRIEF DESCRIPTION OF THE DRAWINGS

FIG. 3 is a perspective view of the layers of material used to form a cover plate in accordance with the present invention and a decorative bezel to accommodate the cover plate;

FIG. 4 is an exploded perspective view of a back-engraved cover plate in accordance with the present invention; and FIG. 5 is a cross-sectional view of the cover plate shown in FIG. 1 taken along line 5—5.

DETAILED DESCRIPTION OF THE PREFERRED EMBODIMENTS

Figure 1:
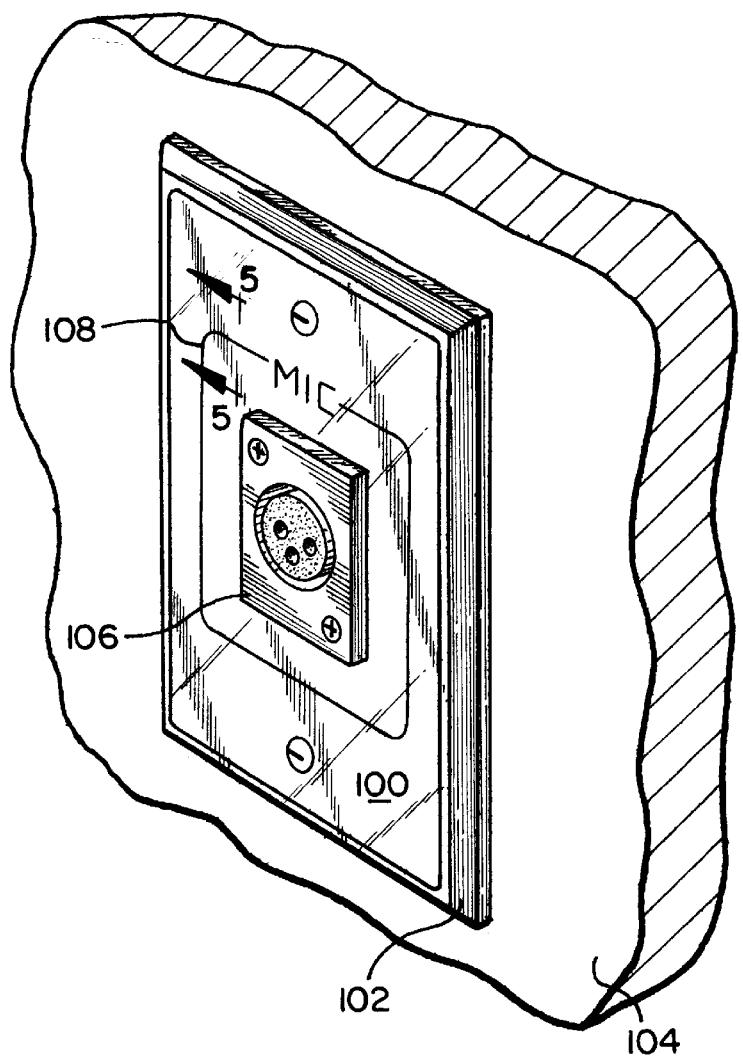
FIG. 1 is a perspective view of a cover plate in accordance with the present invention mounted on a wall with a decorative bezel.

FIG. 1 is a perspective view of a cover plate in accordance with the present invention mounted on a wall. Cover plate 100 is shown mounted in decorative bezel 102 on wall 104. Cover plate 100 has a microphone connector 106 mounted in the center of plate 100. The microphone connector is simply an example and other connectors, such as video jacks, and audio jacks and numerous other connectors could also be employed within plate 100. Alternatively, plate 100 may simply have a bore or hole for receiving a switch or connector mounted in a box behind plate 100. Engraving 108 is shown on plate 100 around microphone connector 106 including the word "MIC" to indicate that the connector 106 is for a microphone. Engraving 108 is formed in plate 100 in accordance with the principles of the invention as discussed below.

Figure 2:
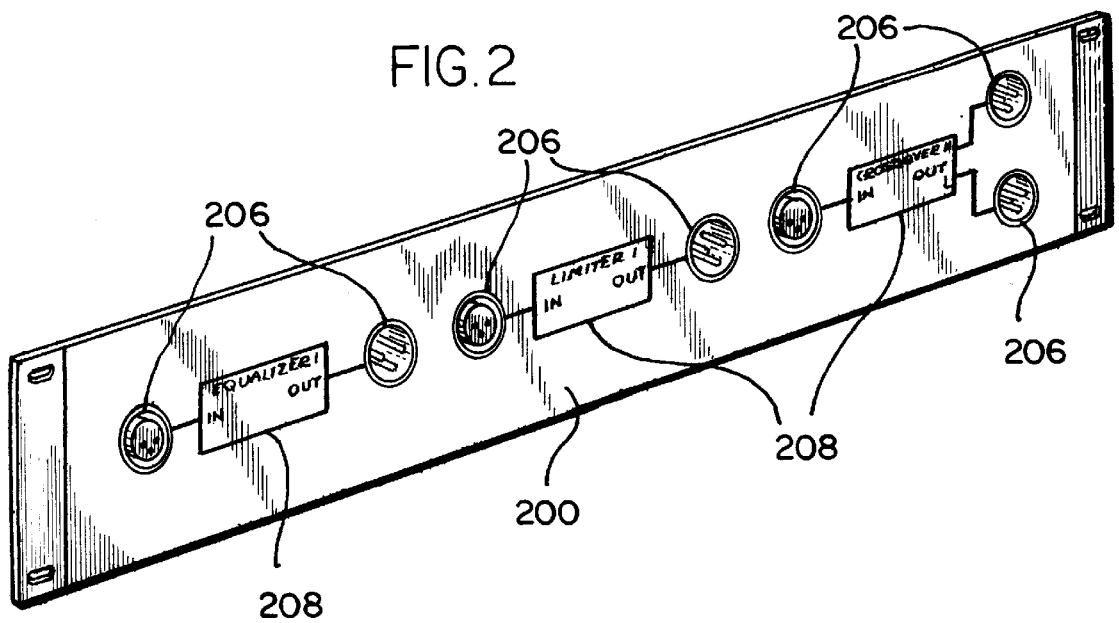
FIG. 2 is a perspective view of an alternate embodiment of a cover plate made in accordance with the present invention for a rack of electrical equipment.

FIG. 2 is a perspective view of a cover plate for use as a cover for a rack of electrical equipment. Cover plate 200 is similar to cover plate 100 shown in FIG. 1. However, no decorative bezel is included with cover plate 200. Cover plate 200 is for use, for example, as the front cover for a rack of audio or visual equipment (not shown). Cover plate 200 is shown with several connectors 206 mounted thereon. As discussed above, these connectors may vary in their function or may alternatively be bores for receiving switches or connectors actually mounted on the equipment. Cover plate 200 has engraving 208 including informative information regarding connectors 206.

Cover plates 100 and 200 are formed from three laminated layers of material. FIG. 3 is an exploded perspective view of the three layers of material used to form cover plate 100. A first layer of transparent material 120 forms the top layer of cover plate 100. A second layer of colored material 122 serves as the middle layer of the cover plate and a third layer of metal 124 forms the bottom or back layer of the cover plate.

First layer of transparent material 120 has a top surface 126 and a bottom surface 128. Preferably, first layer of transparent material 120 is a plastic material. Most preferably, first layer of transparent material 120 is a layer of matte finished PLEXIGLAS DR resin, an all acrylic material which has been extruded into a sheet. This material has greater toughness than normally associated with other impact plastics, while maintaining the outstanding transparency and weatherability of conventional acrylic materials. The material is also easily fabricated, has dimensional stability and chemical resistance. The thickness of the first layer of transparent material may vary depending on the application and typically is in the range of 0.0625 to 0.1250 inches.

Second layer of colored material 122 has a top surface 130 and a bottom surface 132. Both top surface 130 and bottom surface 132 are colored, but not necessarily the same color. Second layer of colored foil 122 is laminated to bottom surface 128 of first layer of transparent material 120 to form sheets that may be cut to the desired size for the plate. The thickness of the second layer of colored material 122 may vary. Second layer of colored material 122 may be a color impregnated opaque foil. Sheets of first layer of transparent material 120 laminated to second layer of colored foil 122 are available from Innovative Plastics Inc. of Algonquin, Ill., sold under the trade name CRYSTALS or from Romark, Inc. of Cleveland, Ohio, sold under the trade name ULTRA-MATTS.

For strength and durability, a third layer of metal 124 may be laminated to layers 120, 122 for the final cover plate. However, as described below, laminated first layer 120 and second layer 122 are engraved prior to being laminated with layer 124. The thickness of the third layer of metal 124 may vary and typically is in the range of 0.080 to 0.125 inches. The preferred material for layer 124 is T-6 6061 Aluminum.

Decorative bezel 102, shown in FIG. 3, has a recessed portion 150, sized to receive the cover plate 100. A bore 152 is provided in the center of bezel 102 for accommodating a connector or switch. The periphery 154 of bezel 102 is shaped at a 45 degree angle. Mounting holes 156 are provided for mounting the bezel, for example, to an electrical box. A preferred material for bezel 102 is zinc or aluminum which has been cast.

The laminated combination of first layer 120 with colored-material layer 122, as shown in FIG. 4, creates what appears to be a colored plate, with the front of the plate being the color of surface 130 and the back of the combination having the color of surface 132. In accordance with the invention, second layer 122 is machined away or engraved in the desired areas. The engraving must be deep enough to remove the entire layer 122 in the appropriate areas. FIG. 4 shows the rectangle with rounded corners and the word "MIC". By machining away layer 122 in the appropriate areas, the engraved portion appears transparent when viewing the plate from the front. This is in contrast to the background color provided by surface 130 in the areas that are not engraved. Most preferably, the engraved portion is filled with paint in a contrasting color. Once the engraving is filled with paint and allowed to dry, third layer 124 is laminated to surface 132 of layer 122 to encapsulate and protect the paint-filled, engraved portion. FIG. 5 shows in cross section the layers resulting from the lamination and engraving processes described above.

Once all three layers of the cover plate are laminated together into an assembly, the assembly may be machined and finished to size and any necessary openings may be cut through the material. Alternatively, the layers may be machined and any necessary openings cut prior to lamination.

Described above is a cover plate that is decorative and customizable with informative information to accommodate a variety of electrical connections. One major advantage of a cover plate in accordance with the invention is that the paint-filled, engraved area is completely sealed from dirt which would eventually fill or discolor a product with the engraving on the top surface. Additionally, the paint-filled, engraved area is protected from chipping because it is sealed from the first layer and the third layer, and therefore, protected and not exposed to normal wear and tear by the user.

While the present invention has been described with respect to specific embodiment thereof, it will be understood that various changes and modifications will be suggested to one skilled in the art and it is intended that the invention encompasses such changes and modifications as fall within the scope of the appended claims.

What is claimed is:

1. A cover plate comprising:

a first layer of a transparent plastic material, said first layer having a top surface and a bottom surface; and a second layer of material having a color, said second layer being laminated to said bottom surface of said first layer, said second layer having a portion selectively removed, said removed portion being filled with paint.

2. The cover plate of claim 1 further comprising a third layer of metal laminated to said second layer of material.

3. The cover plate of claim 2 wherein the third layer comprises aluminum.

4. The cover plate of claim 3 wherein the third layer comprises T-6 6061 aluminum.

5. The cover plate of claim 1 further comprising a bezel that receives and encircles the first and second layers.

6. The cover plate of claim 1 wherein said first layer of transparent plastic material comprises an acrylic sheet.

7. The cover plate of claim 1 wherein said second layer of material comprises a color impregnated opaque layer.

8. The cover plate of claim 1 wherein the first layer and the second layer have the same surface area.

9. The cover plate of claim 1 further comprising a plurality of bores for receiving a plurality of switches and connectors.

10. A method of making a cover plate comprising the steps of:

laminating a transparent plastic sheet to a colored sheet;

engraving a portion of the colored sheet to expose the plastic sheet;

filling the engraved portion of the plastic sheet; and laminating a metal sheet to the colored sheet.

11. The method of claim 10 further comprising the step of boring holes to accommodate switches and connectors.

12. The method of claim 10 further comprising the step of machining the cover plate to size.

\* \* \* \* \*